E. SINNER.

CASH REGISTER.

APPLICATION FILED NOV. 6, 1914.

2 SHEETS—SHEET 1.

Reissued Dec. 29, 1914.

13,857

Witnesses:
Robert Weir
A. W. Curtis

Inventor
Emil Sinner
By: Edwin Thorowgood Jr. Atty

E. SINNER.

CASH REGISTER.

APPLICATION FILED NOV. 6, 1914.

2 SHEETS—SHEET 2.

Reissued Dec. 29, 1914.

13,857.

Witnesses:
Robt. H. Weir
A. W. Carlson

Inventor
Emil Sinner
By Edwin B. Hill & Son Attys.

BEST AVAILABLE COP'

UNITED STATES PATENT OFFICE.

EMIL SINNER, OF MILWAUKEE, WISCONSIN, ASSIGNOR TO THE LA SALLE COMPANY, OF MILWAUKEE, WISCONSIN, A CORPORATION OF WISCONSIN.

CASH-REGISTER.

13,857. Specification of Reissued Letters Patent. Reissued Dec. 29, 1914.

Original No. 1,068,012, dated July 22, 1913, Serial No. 640,980. Reissue No. 13,767, dated July 7, 1914, Serial No. 823,593. This application for reissue filed November 6, 1914. Serial No. 870,716.

*To all whom it may concern:*

Be it known that I, EMIL SINNER, a subject of the German Emperor, residing at Milwaukee, in the county of Milwaukee and State of Wisconsin, have invented new and useful Improvements in Cash-Registers, of which the following is a full, clear, concise, and exact description, reference being had to the accompanying drawing, forming a part of this specification.

This invention relates to improvements in cash registers.

Cash registers have been devised which have a number of pivoted actuators for operating indicators, recorders, and the like; one actuator for cents, one for dimes, and one for dollars. Digit stops, provided with finger keys thereon for operating the same, are pivoted on the actuators. The digit stops with their keys are arranged in progressive order according to the value of the digits that they represent. Depressing a key first extends the digit stop and then swings the actuator about its pivot an angular distance corresponding to the value of the digit being registered. The actuator is arrested by the digit stop striking a fixed stop. As soon as the digit key is released the actuator returns to zero.

The invention is particularly applicable to the above type of cash register but may be employed in other mechanisms.

The objects of the invention are: to provide a cash register of improved construction; to provide a cash register with means for locking the actuators in adjusted position to display the amount of the sale until the locking means is released by the operator; to provide a cash register of the key actuated type with means for locking the actuators in depressed position against all movement until released by the operator; to provide means for insuring against a reactuation of the actuators until after they have returned to zero position after having been released from the locked position; to provide means rendered operative by the setting of an actuator to necessitate a return to zero before the actuator may again be used; to provide means to compel a certain cycle of operations in using the cash register.

Figure 1:
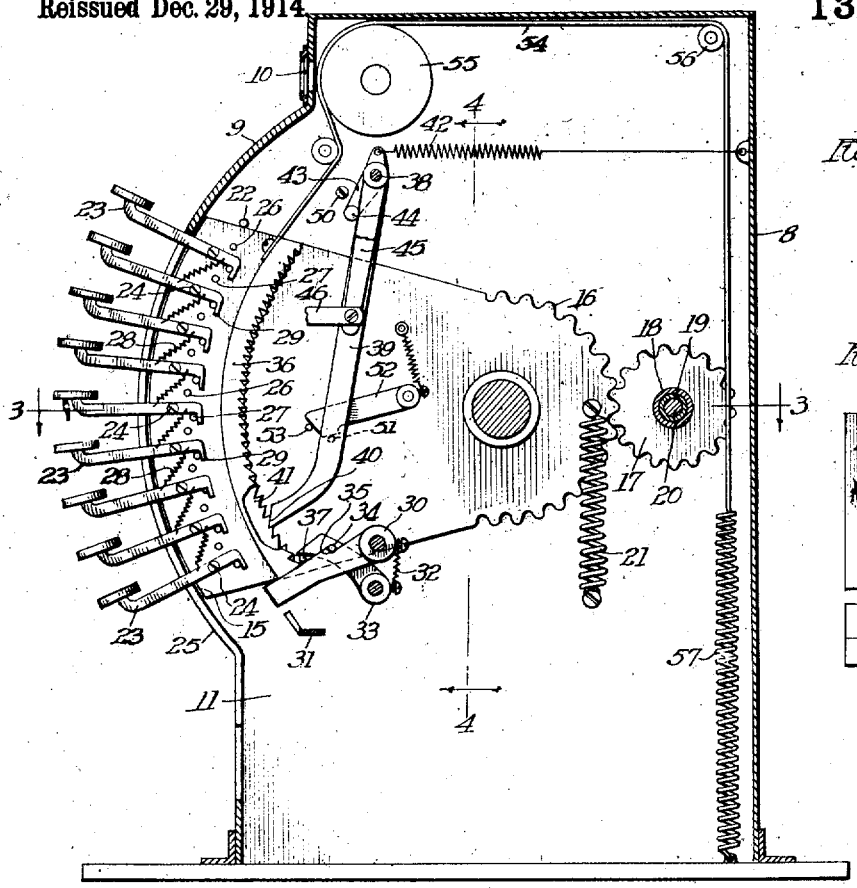
Figure 5:
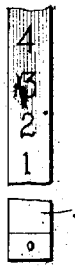
Figure 3:
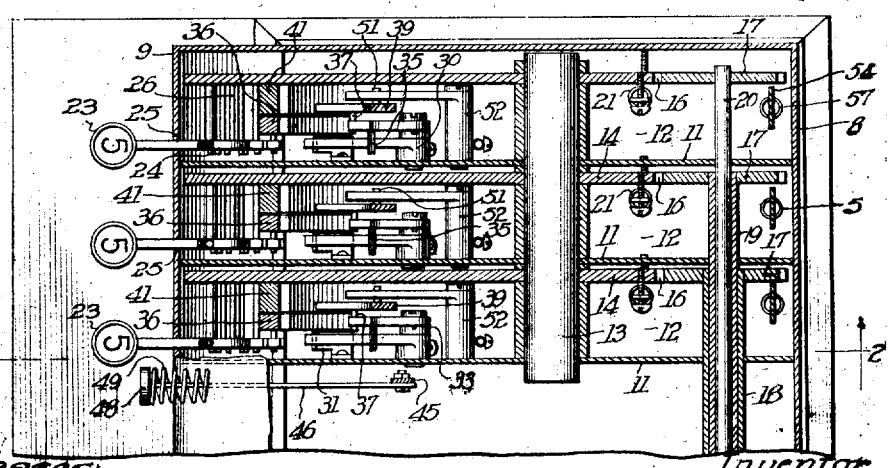
Figure 2:
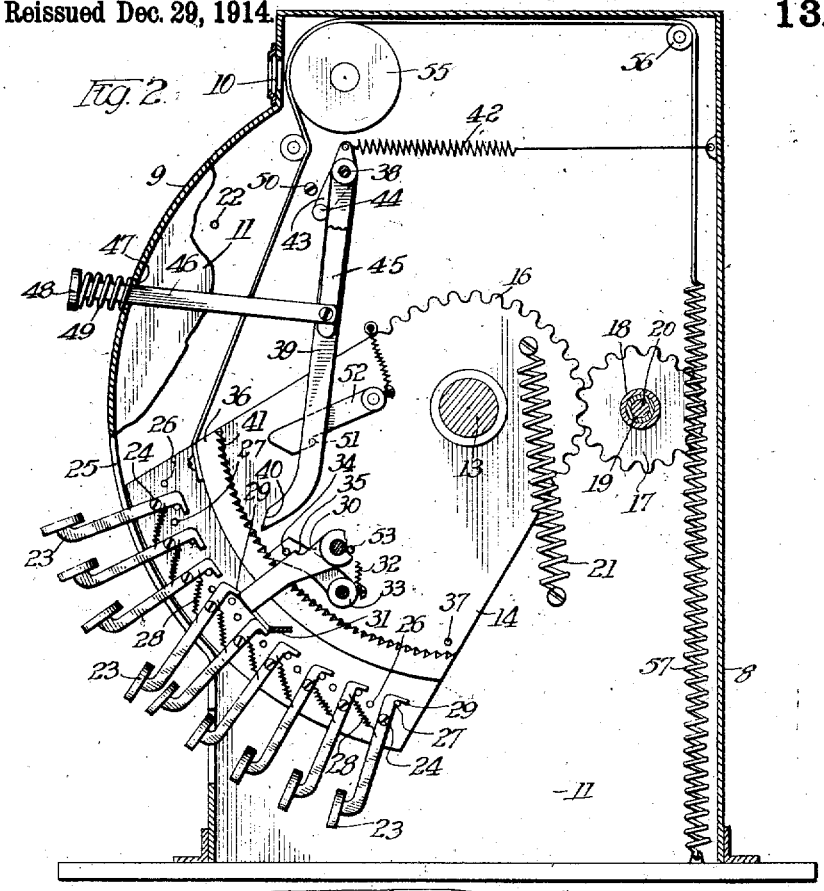
Figure 4:
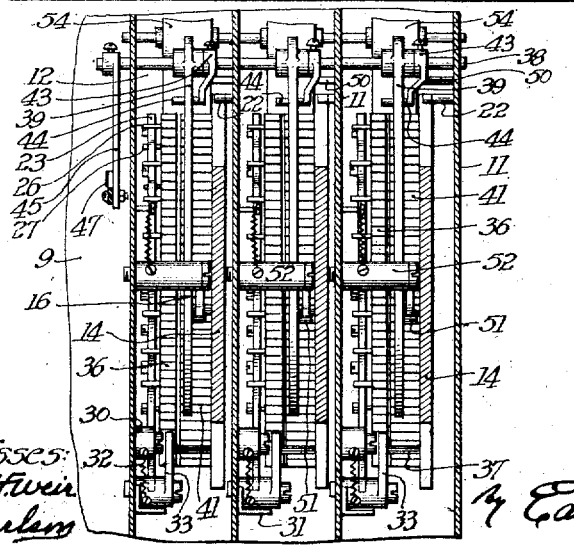

In the drawings: Figure 1 is a vertical cross section taken on the line 1—2 of Fig. 3, with a part of the ratchet bars and the release key broken away, showing the parts in the normal position. Fig. 2 is a similar cross section showing an actuator moved to the set position. Fig. 3 is a horizontal section taken on the line 3—3 of Fig. 1. Fig. 4 is a vertical longitudinal section taken on the line 4—4 of Fig. 1. Fig. 5 is a detail view of part of an indicator strip.

In the machine selected to illustrate an embodiment of the invention, the main operating parts consist of an indicator to indicate the amount of the individual sales, a totalizing register or accumulator and actuators for causing the necessary setting of these parts in accordance with the transaction which it is desired to register. Each actuator may be moved a differential amount by any one of nine digit keys.

The operating parts are protected by a casing 8 of rectangular outline. The sale indicator may be observed through a sight opening 10 facing the operator. The digit keys extend through a slot 25 cut into a curved portion 9 of the casing. The totalizing register (not shown) may be on the outside of the casing and is operated by telescoped shafts 18, 19 and 20, projecting through the side of the casing and operated each by one of the actuators respectively.

In the machine illustrated, three actuators 14 have been provided, one for cents, another for dimes and another for dollars. Each actuator 14 carries upon its outer edge nine digit stops 29 extending outward through the casing and bearing upon the outer end finger keys 23. A fixed stop 31 attached to frame plate 11 is arranged below the lowermost digit stop and is arranged to arrest the movement of the actuator at a certain point of the operation. The digit stops 29 are pivoted on pins 24 attached to the actuator 14. Springs 28 attached to the digit stops maintain the keys in a neutral position against the pins 27. Pins 26 also attached to the actuator limit the movement of the digit stops in the other direction. The actuator 14 is provided with two segmental ratchet bars 36 and 41 facing in opposite directions, each adapted to be engaged by a pawl at the proper period of operation of the machine

BEST AVAILABLE COP

The actuators 14 are pivoted on the main shaft 13 and are provided with means for transmitting motion to the sale indicator and to the totalizing mechanism. Each actuator has gear teeth 16 on the rear hub portion for transmitting motion through the pinion 17 to one of the telescoped shafts 18, 19 and 20. Each actuator is normally held at zero by a spring 21 at the limit of its upward movement by the pin 22 attached to a part of the frame.

To move one of the actuators it is necessary to press one of the digit keys 23. This causes the digit stop to swing on its pivot 24 until it engages a pin 26 and further pressure on the key causes the entire actuator 14 to swing about its pivot 13. The independent movement of the digit stop on its pivot 24 extends the inner end 29 so that it projects into the path of the fixed stop 31. A latch member 30 having a limited rotary movement has its end extending into the path of movement of the digit stop 29 when the latter is in the projecting position. The latch 30 governs a pawl 33 which is held out of engagement with the ratchet 36 by a pin 34 on the pawl 33 resting in a notch 35 in the latch member 30. As the projecting digit stop 29 moves downward toward the fixed stop 31, it strikes the end of latch 30 and moves it against the fixed stop 31, thus serving to arrest the motion of the actuator. Movement of the latch 30 has released the pin 34 from the shoulder 35 and has allowed the pawl member 33 to be cast into the teeth of the ratchet bar 36 by the action of spring 32. The pawl 33 and the ratchet 36 may also serve as means for arresting the movement of the actuator 14, but in addition these parts perform a very useful function of preventing incorrect operation of the actuator while the same is returning to the zero position, as will be described later.

A pawl member 39 mounted loosely on the shaft 38 is pressed into engagement with ratchet bar 41 by the spring 42. As soon as the actuator begins its downward movement the pawl 39 becomes active to prevent return movement of the actuator, and when the actuator has reached the limit of its downward movement by the digit stop 29 striking the latch 30 and being stopped by the fixed stop 31, the actuator will be locked against either forward or return movement and will remain so locked until the pawl 39 is disengaged from the teeth of the ratchet bar 41. This is due to the fact that the digit stop 29 cannot be retracted until a slight upward motion of the actuator 14 occurs, and the pawl 39 prevents such upward motion by engaging the teeth of ratchet 41. This locking action of the actuator in its arrested position prevents a second operation of the same actuator either by mistake or through design until the entire machine is cleared by restoring to the zero position. Any change of the setting of the actuator is also prevented until the machine is cleared.

Each actuator 14 is provided with a pawl and ratchet 41 to operate independently to prevent return movement of the respective actuators until a common means in the form of a release key 46 simultaneously releases all the pawls 39. Shaft 38 has rigidly attached thereto an operating arm 45 which is attached to the release key 46. Adjacent to each pawl 39 is a short arm lever 43 provided with a pin 44 positioned in front of its pawl 39 and adapted to disengage its pawl 39 from the ratchet teeth when the release key 46 is operated. The release key extends through an opening 47 in the casing and is provided at its outer end with a finger piece 48. A spring 49 interposed between the finger piece 48 and the casing prevents any interference of the pins 44 with the pawls 39.

When the actuators are released by depression of the release key, they are free to return to the zero position under the influence of springs 21, as each pawl member 39 is prevented from interfering with the return movement by being held out of engagement with the ratchet member 41 through the action of latch member 52 which engages and holds a pin 51 attached to the pawl member 39, as shown in Fig. 2.

Each actuator must return completely to zero before it may again be depressed as the pawl member 33 rides over the ratchet 36 and is not freed therefrom until the limit of upward movement is again reached. As the actuator approaches the zero position, a pin 37 fastened to the actuator disengages the pawl 33 from its ratchet 36 and allows the latch member 30 to hold it in that position by engagement of the shoulder 35 with the pin 34.

As soon as the actuator is freed from the control of pawl 33, it is again placed under the influence of pawl 39. This is accomplished by a pin 53 also mounted on the actuator in such a position that as the actuator comes to zero, the pin 53 will raise the latch 52 and allow the pawl 39 to be cast into the ratchet 41.

It can be seen that the above described mechanism places the actuator under the control of pawl 39 and ratchet 41 to prevent a return movement of the actuator after it has once been moved from initial position. The operator therefore, depresses it until it can be depressed no farther. At this point is is completely locked until positively released by the operator. The arrest of the downward movement of the actuator places the latter under the control of pawl 33 and ratchet 36 and the reactuation prior to the

BEST AVAILABLE COP' completion of the return stroke is thereby prevented. As the zero position is reached, the last named pawl and ratchet 33—36 is rendered inactive and the actuator is again placed under the control of the first pawl and ratchet means 39—41. It will thus be seen that the two pairs of pawls and ratchets are operative to perform their functions regardless of the extent of movement of the actuator. That is, the full desired movement in both directions is insured whether said movement is through a very small arc or through an arc nine times as great.

The sale indicator is operated directly by the movement of the actuator and consists of a flexible strip 54 with numerals marked thereupon corresponding in value to the digit keys. This flexible strip passes over a drum 55 inside the casing so as to expose the proper number at the sight opening 10 corresponding to the position to which the actuator has been moved. This strip 54 passes over a roller 56 and is held under tension by spring 57 which plays out and takes up the strip 54 in accordance with the movement of the indicator to which it is attached.

In the particular machine illustrated there are three actuators, each having its own set of digit keys, controlling mechanism, indicator and totalizing mechanism and it is evident that a machine of any desired capacity may be constructed by merely duplicating the actuators with their appended mechanism.

The operation of the machine will now be described. When it is desired to register a sale or other transaction which might be represented in dollars, dimes and cents, the digit key corresponding in value to the number of dollars is depressed. Depression of the key causes a digit stop 29 to be extended into the path of the latch 30 and the fixed stop 31, and as further independent movement of the key is prevented by the pin 26, the entire actuator will be swung downward until the digit stop 29 engages the latch 30 and is positively stopped by the fixed stop 31. Downward movement of the actuator has moved the sale indicator so that the number on the indicating strip corresponding to the key depressed, will be exposed at the sight opening facing the operator. At the same time one of the registering pinions corresponding to the actuator will be moved an amount corresponding to the key depressed. When the digit stop has come into engagement with the fixed stop, the actuator is locked against movement in either a forward or return direction. It is now impossible to make any change in the setting of this actuator and it is also impossible to operate it again until the entire machine is cleared by operating the common release key. As the actuator is arrested it releases the pawl permitting it to engage the teeth of the ratchet to aid in stopping the actuator and also to put the actuator under the control of the pawl and ratchet mechanism to insure a return to zero. The dime actuator may now be operated by depressing the proper key corresponding to the number of dimes to be registered. A similar locking of the actuator at the end of its movement occurs and a transfer of control from the one pawl and ratchet mechanism to the other is made in a manner similar to that of the dollar actuator. The cent actuator is then operated by depressing the proper key and performing the same operations described in connection with the operation of the dollar actuator. After all the keys that are necessary to register a transaction have been depressed, the common release key is operated. This allows the pawl and ratchet mechanism 33—36 to assume control of the movement of the actuator while the control by the pawl and ratchet mechanism 39—41 has been suspended, and a return to zero is necessitated. When the actuator returns to zero, the pawl 33 is removed from control and the pawl 39 is placed in control. It is thus seen that a certain sequence of operations is necessitated by the arrangement of the controlling mechanisms and the possibility of erroneous or incomplete operation is reduced to a minimum.

It is apparent that many and various changes may be made in the details of construction herein described and illustrated without departing from the spirit of the invention. Accordingly I do not desire to limit myself to the details under consideration or to the relative arrangement of parts except where limitations are imposed in the appended claims.

What is claimed is the following:

1. In a cash register, a pivoted actuator, a plurality of adjustable digit stops thereon, relatively fixed means arranged to be engaged by any adjusted digit stop to provide for a differential movement of said actuator by limiting the advance thereof to various successive positions and means for maintaining the engagement between the adjusted stop and said fixed means to prevent restoration of said stop, whereby said actuator is positively locked against movement either forward or backward.

2. In a cash register, a pivoted actuator, a plurality of extensible digit stops mounted thereon in the arc of a circle, a relatively fixed stop mounted so as to be engaged by any one of said digit stops when extended, thereby providing for a differential throw of said actuator to any one of a number of successive angular positions, and means for positively locking the extended stop against said fixed stop after engagement therewith.

BEST AVAILABLE COP' whereby said actuator is positively locked against movement either forward or backward.

3. In a cash register, a pivoted actuator having a plurality of pivotal supports thereon arranged in the arc of a circle, a plurality of digit key levers each pivotally mounted on one of said supports, a digit key carried by each of said levers whereby upon actuation of any key, the inner end of said lever may be projected inwardly, a relatively fixed stop arranged to be engaged by the inwardly projected ends of said key levers to limit the forward movement of said actuator and a pawl and ratchet coöperating with said actuator to lock the projected key lever against said fixed stop thereby preventing return movement of said actuator whereby the latter is positively locked against movement in either direction.

4. In a cash register, a pivoted actuator, digit keys thereon, a relatively fixed stop to be engaged by said keys to limit the forward movement of said actuator, a pawl and ratchet associated with said actuator to prevent return movement thereof, a release key for disengaging said pawl and ratchet to permit restoration of said actuator to initial position and means for maintaining said disengagement until initial position has been reached.

5. In a cash register, a pivoted actuator, digit keys thereon, a relatively fixed stop, a pawl and ratchet associated with said actuator to prevent return movement thereof, a release key for disengaging said pawl and ratchet to permit said return movement to initial position, a latch rendered operative by said release key for holding said pawl and ratchet out of engagement with each other during said return movement and means on said actuator for automatically tripping said latch when initial position is reached to permit reëngagement of said pawl and ratchet.

6. In a cash register, a pivoted actuator, digit keys thereon, a relatively fixed stop for limiting the forward movement of said actuator, a pawl and ratchet mechanism associated with said actuator, said mechanism being normally rendered inoperative by said stop to permit forward movement of said actuator, but being rendered operative when said stop is engaged by a digit key, whereby said mechanism operates to prevent reactuation of said actuator until it is fully restored to initial position and means for again rendering said mechanism inoperative when initial position is reached.

7. In a cash register, a pivoted actuator, a ratchet movable therewith, a movable stop lever for limiting the forward movement of said actuator, a pawl arranged, when in engagement with said ratchet, to prevent forward movement of said actuator, but to permit return movement thereof, said stop lever constituting a latch for normally holding said pawl out of engagement with said ratchet, means on said actuator for moving said stop lever to unlatch said pawl at the end of the forward movement of said actuator and means for causing a reëngagement with said latch to hold it in operative position after restoration of said actuator to starting position.

8. In a cash register, a pivoted actuator having a differential movement, a double pawl and ratchet mechanism associated therewith, one pawl and ratchet operating to prevent movement of said actuator in a forward direction and the other pawl and ratchet mechanism operating to prevent movement of said actuator in a return direction, a latch for each pawl whereby it may be held in inoperative position, means for tripping one latch at the end of the forward movement of said actuator and means for tripping the other latch at the end of the return movement of said actuator to compel the full desired movement in both directions, said means being controlled by said actuator to operate for any of the differential movements thereof.

9. In a cash register, a pivoted actuator, having a pair of arc shaped ratchets thereon with the teeth arranged in opposite directions, a pair of pawls, each arranged to engage one ratchet to permit movement of said actuator in one direction but not in the other and means controlled by said actuator at the limit of its stroke in either direction to render one or the other pair of pawls and ratchets operative to insure full movement of said actuator on the next succeeding stroke thereof regardless of the amplitude of said stroke.

10. In a cash register, an actuator, pawl and ratchet mechanism for preventing movement of said actuator in one direction, one member of said mechanism being movable with said actuator and another member thereof being relatively stationary, digit stops for moving the actuator in another direction, having an independent movement to extend said digit stops, a fixed stop engaged by the digit stops in the extended position for arresting movement of the actuator, said pawl and ratchet mechanism cooperating with the fixed stop to retain the digit stop in extended position to lock the actuator against movement in both directions.

1. In a cash register an actuator having forward and return movement, controlling means allowing forward movement of said actuator, means to arrest the actuator, said controlling and said arresting means operating to lock the actuator, a second controlling means allowing return movement of said actuator, said second controlling means

BEST AVAILABLE COPY being rendered operative by said arresting means.

12. In a cash register, an actuator having forward and return movement, controlling means allowing forward movement of said actuator, means to arrest the actuator, said controlling and said arresting means operating to lock the actuator, a second controlling means allowing return movement of said actuator, said second controlling means set into operative condition by said arresting means, and means for rendering said first controlling means inoperative.

13. In a cash register, an actuator having a differential forward and return movement, controlling means operative during forward movement to prevent return movement of the actuator, a second controlling means operative during return movement to prevent forward movement thereof, means to arrest the actuator during its forward movement and to render the second controlling means operative, and means for rendering the first means inoperative during return movement of the actuator.

14. In a cash register, an actuator having a differential forward and return movement, controlling means operative during forward movement to prevent return movement of the actuator, a second controlling means operative during return movement to prevent forward movement thereof, means to arrest the actuator during its forward movement and to render the second controlling means operative, means for rendering the first means inoperative during return movement of the actuator, means for again rendering the first controlling means operative, and means for again rendering the second means inoperative when the return movement of the actuator is completed.

15. In a cash register, an actuator having a differential movement, means to move said actuator forward, means coöperating therewith to arrest said actuator, controlling means governing the forward movement of said actuator, means to return said actuator to initial position, a second controlling means governing the return movement of said actuator, and release means to render said first controlling means inoperative, said arresting means rendering said second controlling means operative.

16. In a cash register, an actuator having forward and return movement, controlling means normally operative during the forward movement of the actuator, arresting means for arresting forward movement of said actuator, said controlling means and said arresting means coöperating to lock the actuator in arrested position, means to place the first controlling means in inoperative condition, and a second normally inoperative controlling means put into operative condition by the arresting means to control the actuator during return movement.

17. A cash register comprising a plurality of actuators provided with ratchet bars, a plurality of digit stops pivoted to the actuators and having a movement preliminary to the movement of the actuators, pawl mechanisms engaged by the digit stops to cause said mechanisms to engage the ratchet bars, stops engaged by the pawl mechanisms for limiting the movement of the actuators, pawls yieldingly engaging the actuators for preventing return movement of said actuators before the movements are completed and also for temporarily holding the actuators at the end of their movements.

18. A cash register comprising a plurality of actuators provided with ratchet bars, a plurality of digit stops pivoted to each actuator and each stop having a movement preliminary to the movement of the actuator to which it is connected, stops for limiting the movement of said digit stops with relation to the actuators, pawl mechanisms engaged by the digit stops to cause the pawl mechanisms to engage the ratchet bars, stops engaged by the pawl mechanisms for limiting the movements of the actuators, pivoted pawls engaging the ratchet bars, means for simultaneously moving all of said pawls out of engagement with the ratchet bars, means for locking said pawls in ratchet disengaging positions and means for automatically releasing the pawls from locked positions.

19. A cash register, comprising a plurality of actuators provided with ratchet bars, a plurality of digit stops pivoted to each actuator and each stop having a movement preliminary to the movement of the actuator to which it is connected, stops for limiting the movement of said digit stops with relation to the actuators, pawl mechanisms engaged by the digit stops to cause them to engage the ratchet bars, stops engaged by the pawl mechanisms for limiting the movement of the actuators, pivoted pawls yieldingly and independently engaging the ratchet bars, a shaft on which said pawls are pivoted, short arms carried by the shaft for engaging all of the pivoted pawls simultaneously, a key for locking said shaft, latches for locking said pivoted pawls in ratchet disengaging positions, and means for automatically releasing the pawls from locked position when the actuators are swung to their normal positions.

20. A cash register, comprising a plurality of pivoted actuators provided with segmental ratchet bars positioned concentrically with relation to the axial line of the pivoted connection of the actuators, a plurality of digit stops pivoted to each actuator and having their pivoted connections arranged in an arc which is also concentric with relation to the axial line, said digit stops hav-

BEST AVAILABLE COP' ing projecting fingers, stops for limiting the movement of the digit stops independently of the movements of the actuators, stop brackets, pawl mechanisms adapted to be engaged by digit stops which are depressed to move the pawls into engagement with the ratchet bars and other parts of the pawl mechanism into engagement with the stop brackets, a rock shaft provided with short arms, depending pawls loosely mounted on the shaft and having their lower ends engaging the ratchet bars, spring means for yieldingly holding the depending pawls in engagement with the ratchet bars, a releasing key connected to the rock shaft for causing the short arms to move the depending pawls out of engagement with the ratchet bars, latches for locking the depending pawls in ratchet disengaging positions, and projections carried by the actuators for automatically releasing said pawls from said latches.

21. A cash register having a plurality of pivoted actuators, each provided with a series of digit key levers arranged thereon in an arc, a yieldingly mounted stop and a fixed abutment, said key levers being arranged to normally clear said yielding stop but adapted to engage the same when depressed to move said actuator, said engagement serving to move said yielding stop against said abutment whereby the movement of said actuator is positively limited by the latter.

22. In a cash register, a pivoted actuator, an arc shaped ratchet movable therewith, a pawl for normally preventing a return movement of said actuator, means for limiting the throw of said actuator to any one of nine successive positions, a release key for disengaging said pawl from said ratchet to permit restoration of said actuator, a latch for holding said pawl in disengaged position and a projection on said actuator for tripping said latch when said actuator is restored to initial position.

23. In a cash register, a plurality of pivoted actuators, nine key-levers pivoted to each actuator along an arc of a circle, a digit key carried by each lever, pins adjacent the inner ends of said levers, springs connecting adjacent levers, each serving to hold the lever above it against its stop to maintain said lever in normal position and each pin serving also to limit the movement of the adjacent lower lever about its pivot when the corresponding key is depressed.

In witness whereof, I have hereunto subscribed my name in the presence of two witnesses.

EMIL SINNER.

Witnesses:

JOHN A. DIRNNER,

W. E. SARGENT.